(12) United States Patent
Petty

(10) Patent No.: US 8,464,763 B2
(45) Date of Patent: Jun. 18, 2013

(54) BRAKE FLUSH MACHINE

(75) Inventor: Jon A. Petty, St. George, UT (US)

(73) Assignee: Phoenix Systems, L.L.C., St. George, UT (US)

( * ) Notice: Subject to any disclaimer, the term of this patent is extended or adjusted under 35 U.S.C. 154(b) by 1180 days.

(21) Appl. No.: 12/169,141

(22) Filed: Jul. 8, 2008

(65) Prior Publication Data

US 2009/0032136 A1 Feb. 5, 2009

Related U.S. Application Data

(63) Continuation-in-part of application No. 11/265,820, filed on Nov. 3, 2005, now abandoned.

(51) Int. Cl.
   *B65B 31/00* (2006.01)
(52) U.S. Cl.
   USPC .............................. 141/65; 188/352
(58) Field of Classification Search
   USPC ............................ 141/65; 188/352
   See application file for complete search history.

(56) References Cited

U.S. PATENT DOCUMENTS

| | | | | |
|---|---|---|---|---|
| 4,741,417 A * | 5/1988 | Caramanna | ................... | 188/352 |
| 5,944,068 A * | 8/1999 | Hool | ............................... | 141/65 |
| 6,302,167 B1 * | 10/2001 | Hollub | ........................... | 141/65 |
| 6,729,364 B2 * | 5/2004 | Few et al. | ...................... | 141/65 |
| 6,796,339 B1 * | 9/2004 | Petty | ............................... | 141/65 |
| 6,830,083 B1 * | 12/2004 | Hollub et al. | .................. | 141/65 |
| 6,929,036 B2 * | 8/2005 | Awad | ............................. | 141/65 |
| 2003/0037837 A1 * | 2/2003 | Erwin et al. | .................... | 141/65 |
| 2005/0098226 A1 * | 5/2005 | Rounds et al. | ................. | 141/65 |

* cited by examiner

*Primary Examiner* — Gregory Huson
*Assistant Examiner* — Nicolas A Arnett
(74) *Attorney, Agent, or Firm* — Quarles & Brady LLP; Gavin J. Milczarek-Desai

(57) ABSTRACT

A fluid-distribution system includes a plurality of fluid-distribution nodes with three-way ports attached to bleed/flush lines and alternate ports attached to vacuum lines. A first pump is used to draw new brake fluid from a new fluid container, push it through the manifold and ports, and through the bleed/flush lines. Fluid flow through the ports is selectively controlled by a computing device. In this manner, a vehicle's brake system including individual brake lines and ABS systems, may be flushed in a prescribed sequence. The vacuum lines are connected to a second pump via alternate ports of the sequential control valve manifold and may be used evacuated air and contaminated brake fluid from the vehicle's bleeder valves or master cylinder. Additionally, the bleed/flush lines may be connected to the alternate ports during priming or purging of the system. This also facilitates storage of the bleed lines as it prevents brake fluid from spilling and prevents air from entering the system.

22 Claims, 18 Drawing Sheets

| Process | 204 | 206 | 208 | 210 | 212 | 214 | 218 | 220 | 230 | P1 | P2 |
|---|---|---|---|---|---|---|---|---|---|---|---|
| Evacuate | B | B | B | B | B | T | B | T | PASS | OFF | ON |
| Fill M/C | T | T | T | T | T | T | T | B | PASS | ON | OFF |
| Line 1 | T | B | B | B | B | T | T | B | PASS | ON | OFF |
| Line 2 | B | T | B | B | B | T | T | B | PASS | ON | OFF |
| Line 3 | B | B | T | B | B | T | T | B | PASS | ON | OFF |
| Line 4 | B | B | B | T | B | T | T | B | PASS | ON | OFF |
| ABS | B | B | B | B | T | T | T | B | PASS | ON | OFF |
| All Lines | T | T | T | T | T | T | T | B | PASS | ON | OFF |
| Expel | T | T | T | T | T | B | T | B | EXPEL | OFF | ON |
| Vacuum 1 | B | B | B | B | B | T | T | B | PASS | ON | ON |
| Vacuum 2 | B | B | B | B | B | T | T | B | PASS | OFF | ON |
| Cross Flush | B | T | B | B | B | T | T | B | PASS | ON | ON |
| Prime | T | T | T | T | T | T | T | T | PASS | ON | OFF |

T = Path between Common Port and Top Port
B = Path between Common Port and Bottom Port
PASS = Three-way valve in pass-through mode
EXPEL = Three-way valve in divert to external of brake flush machine system

Figure 16

BRAKE FLUSH MACHINE

CROSS REFERENCE TO RELATED APPLICATION

This application is a continuation-in-part of U.S. patent application Ser. No. 11/265,820, which was filed on Nov. 3, 2005.

BACKGROUND OF THE INVENTION

1. Field of the Invention

This invention is related in general to the field of automotive maintenance systems. In particular, the invention consists of a brake flush machine that allows sequential flushing of a vehicle's brake lines and anti-lock braking system ("ABS").

2. Description of the Prior Art

Anti-lock brake system (ABS) design utilizes multiple hydraulic passageways and valving that restricts fluid movement. This means that fluid flowing through the system will be limited and may take excessive time to properly flush the system. The pressure that can be exerted on the system is limited by the master cylinder reservoir adapter. The adapter connects the pressurized fluid from a brake flush machine to the master cylinder reservoir to the brake system. Most reservoirs are a composite or plastic material and cannot be exposed to pressures above 20 psi without deforming the shape of the reservoir and causing leakage. Most brake flush machines limit master cylinder reservoir pressure to 12-18 psi to prevent leakage. The low pressure also makes removing brake fluid contamination more difficult.

In addition, the fluid does not move through each wheel system equally, but it will take the path of least resistance. Some brake flush machines flush all the wheels at the same time. A machine designed to flush all the wheels at the same time may experience an unequal system flush. This means that one part of the system may experience minimal fluid flow, which will not provide a proper flush.

Isolated flush machines isolate different parts of the system to control fluid flow. This allows the machine to force fluid though the more restrictive circuits. The downside is that the flush time is lengthened because the flow is isolated to a part of the system and not all the wheels at the same time. A properly isolated flush could take 2-3 times longer to move the same amount of fluid as an all-wheel flush, keeping in mind that the all-wheel flush also experiences an unequal system flush.

Empirical testing using Strip Dip7 brake fluid test strips has shown that it takes approximately 2 gallon of brake fluid flushed equally through the system at sufficient pressure and flow to attain a proper flush to remove contaminants. Most all wheel flush machines use 2 gallon fluid container and operate for 10-12 minutes. The last minute or two of the cycle removes whatever fluid is left in the container and dumps it into the waste container so that the service uses 2 gallon of brake fluid each time. This does not mean the 2 gallon of brake fluid was flushed through the system, but only that 2 gallon of brake fluid was consumed. The actual flush may have used 1 quart of fresh fluid and the other quart was dumped into the waste. The reason this is done is to complete the flush within the allotted time period and consume 2 gallon of brake fluid per service regardless of the quality of flush.

There is also a low/no pressure area in many master cylinder designs that is isolated from the normal fluid pathway during a flush. This leaves an area of old fluid that can contaminate the new brake fluid after the flush has been performed. Even if 2 gallon of brake fluid is flushed through the system, the isolated low pressure area can contaminate the brake fluid once the brake pedal is depressed a few times. Depressing and holding the brake pedal exposes the new fluid to the low pressure area. This has been demonstrated again by the use of FASCAR7 Strip Dip brake fluid test strips. A candidate vehicle was tested with Strip Dip7, demonstrating a FASCAR7 rating of 100. The brake flush was performed using ½ gallon of brake fluid using proper sequencing and isolation and the brake fluid was immediately tested after the service, which results in a FASCAR7 rating of 0. The vehicle is then driven in which the brake pedal is depressed several times during normal braking and a Strip Dip7 retest is performed, which results in a FASCAR7 rating of 25. It is not a problem with the test strip, but the low/no pressure area was not cleaned during the flush process and the old fluid contaminated the rest of the system.

To attain a proper brake system flush, approximately ½ gallon of brake fluid must be flushed through the system at sufficient pressure, circuit isolation, and flow to remove contaminates. In addition, the low/no pressure area of the master cylinder must be exposed to fluid flow to flush that portion of the system to prevent future contamination. An isolated brake flush machine could take as long as 30 minutes to properly introduce ½ gallon of brake fluid sequentially through the system, while current all wheel flush machines operate for 10-12 minutes and waste the unused fluid. Each brake flush machine design has severe design flaws, first is the time to perform service or, second, the quality of the service performed.

There are different classifications and standards for brake fluid, D.O.T. 3, 4, 5, and 5.1 (synthetic). D.O.T. 3, 4, and 5.1 brake fluids can be mixed together and perform to at least the minimum specification of the primary fluid. The seals in the brake system are compatible with these fluids. D.O.T. 5 is a silicone based fluid and cannot be mixed with any other type of brake fluid and will void many original equipment brake part warranties if used in a vehicle. D.O.T. 5 is primarily used for off-road use like racing and in motorcycle brake systems.

In addition, there are several manufacturers of brake fluids in the same D.O.T. class that have varying performance criteria. Many original equipment manufacturers have their own formulation of brake fluid. Therefore, it is desirable to have a brake flush machine that can be used with various manufacturers' specifications of brake fluid. It is therefore important for the brake flush machine to be able to purge the brake flush machine with fluid used in the last service and prime the brake flush machine with the desired fluid for the next service. This feature gives the user the ability to service a variety of vehicles each with the original equipment manufacturer's brand of brake fluid.

Most late model anti-lock braking systems ("ABS") require the use of a scan tool to properly bleed and flush the brake system. There are no current brake flush machines that allow the user to use a scan tool while the automated brake flush is performed. It is therefore desirable to have an interface which allows the user to perform various bleed/flush tasks as prompted by the scan tool.

Accordingly, it is desirable to have a brake flush system that primes brake fluid into a brake flush machine's bleed/flush lines in a manner that removes air and different types of fluid from these bleed lines and introduces the correct type of brake fluid. Additionally, it is desirable to have a system of sequentially flushing various bleed lines and ABS systems. It is also desirable to have an easy-to-use interface such as a graphical user interface or combination of graphic symbols or letters, lights, lamps, LEDs, buzzers, and speakers. A method of quickly connecting and disconnecting bleed lines and preventing fluid from flowing in the wrong direction is desirable as well. Other desirable features include utilizing a dual-pump manifold system to pressurize some fluid lines while providing vacuum on others; notifying a user when a low-flow, fluid empty, or system leak situation occurs; utilizing OEM scan tools such as GM Tech 2®; providing troubleshooting and diagnostics for the brake fluid machine; and performing reverse fluid injection, vacuum bleeding, pressure bleeding, and test-bench bleeding using the same bleed lines.

SUMMARY OF THE INVENTION

The invention disclosed herein utilizes a fluid-distribution system including one or more pumps, a plurality of fluid-distribution nodes, an onboard computer, and bleed/flush lines to sequentially flush a vehicle's brake system. A purge cycle allows the brake flush machine to remove air, old fluid, or the wrong type of fluid from the machine's manifold and bleed lines. The plurality of fluid-distribution nodes includes solenoids that are controlled by the onboard computer that allow for sequentially flushing of various bleed lines and the vehicle's ABS system, if present. Additionally, the fluid-distribution system is capable of closed-loop priming with fluid for the next service.

A graphical user interface displays various information and may include a touch screen input device. Alternatively, a user interface may include a combination of graphic symbols or letters, lights, lamps, LEDs, buzzers, and speakers to communicate information to a technician.

Quick connect fittings are added to the bleed lines to allow the quick connecting and disconnecting from bleed valves. An optional check valve in each bleed/flush line prevents fluid from flowing in the wrong direction, preventing air or waste fluid from back-flowing into the vehicle's brake system.

A dual-pump sequential control manifold allows the system to pressurize some fluid lines while providing vacuum on others, if desired. This decreases the time necessary to flush the brake system and increases the brake flush machine's ability to remove contaminants from the vehicle.

Another feature of the invention involves utilizing a notification system of graphical screens, lights, lamps, LEDs, buzzers or speakers to notify a user when a low-flow, fluid empty, or system leak situation occurs. Yet another feature is an interface that allows the fluid-distribution system to utilize OEM scan tools such as GM Tech 2.5. Another aspect of the invention is a memory device for storing vehicle user manuals or bleed sequences that may be displayed on the GUI. The invention also includes troubleshooting and diagnostics systems for the brake fluid machine itself.

Various other purposes and advantages of the invention will become clear from its description in the specification that follows and from the novel features particularly pointed out in the appended claims. Therefore, to the accomplishment of the objectives described above, this invention comprises the features hereinafter illustrated in the drawings, fully described in the detailed description of the preferred embodiments, and particularly pointed out in the claims. However, such drawings, description, and claims disclose just a few of the various ways in which the invention may be practiced.

BRIEF DESCRIPTION OF THE DRAWINGS

FIG. 16 is a block diagram illustrating the fluid-distribution system of FIG. 15 with an additional fluid-distribution node to facilitate priming the fluid-distribution system and specifically the bleed/flush lines.

DESCRIPTION OF THE PREFERRED EMBODIMENTS

This invention is based on the idea of using a fluid-distribution system to selectively flush brake lines, master cylinders, and anti-lock brake ("ABS") systems or other hydraulic brake components in a vehicle. For the purposes of this application, bleed lines, flush lines, and bleed/flush lines are used interchangeably. Additionally, a manifold or distribution node is used interchangeably to refer to a volume including multiple ports. A three-port valve is used herein to indicate a valve that includes at least three ports. A common port may alternatively be connected to either of the other two ports. Connections may be made from the fluid-distribution system to the vehicle via the vehicles bleed valves and master cylinder, referred to herein as discrete fluid-flow elements.

Figure 1:
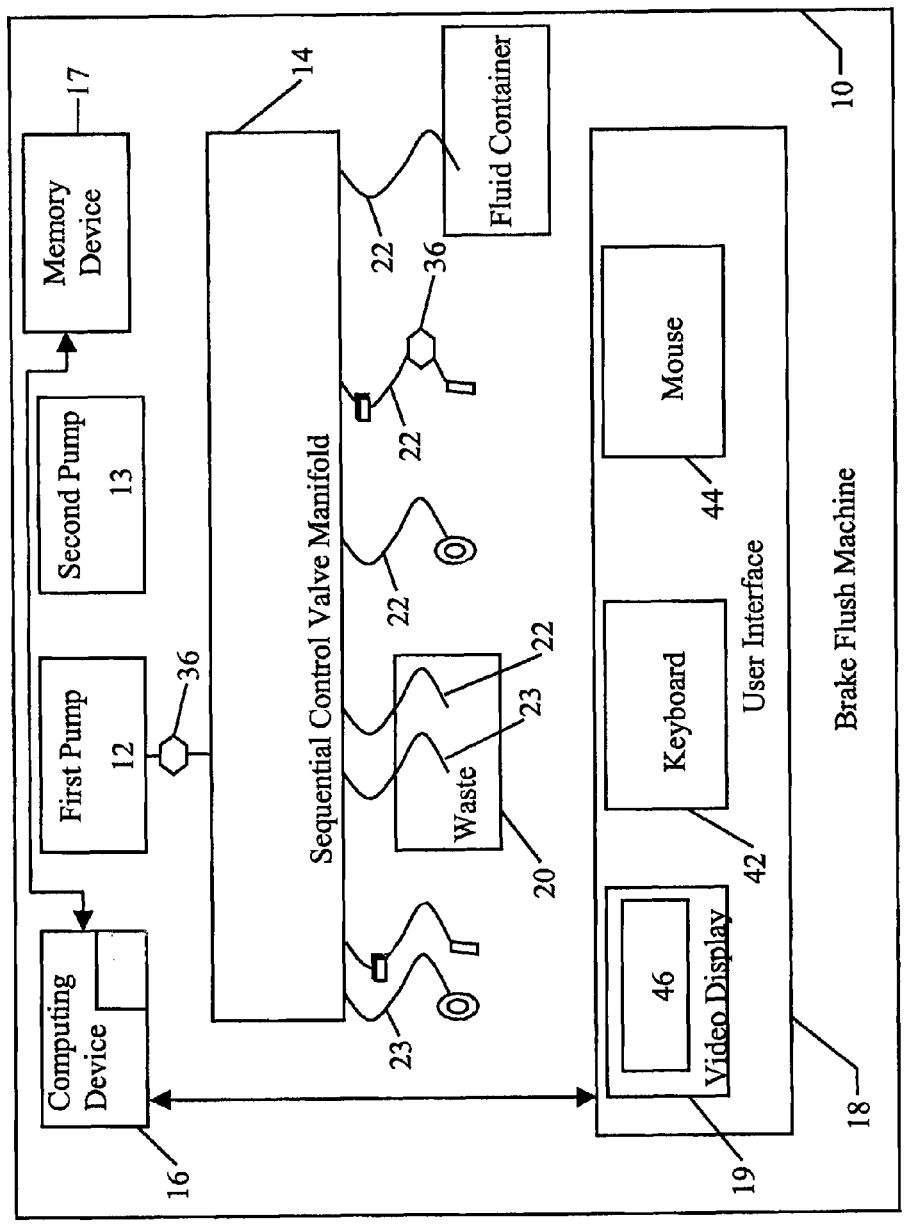
FIG. 1 is a block diagram illustrating a fluid-distribution system including one or more pumps, a plurality of fluid-distribution nodes, an onboard computer, a user-interface, a waste receptacle, and a plurality of bleed/flush lines.

Referring to figures, wherein like parts are designated with the same reference numerals and symbols, FIG. 1 is a block diagram illustrating a fluid-distribution system 10 including one or more pumps 12, 13, a plurality of fluid distribution nodes 14, a computing device 16, a user-interface 18, a waste receptacle 20, and a plurality of bleed/flush lines 22 and vacuum lines 23. The primary purpose of the fluid-distribution system 10 is to introduce new brake fluid into a master cylinder and brake lines of a vehicle in a manner designed to force air and contaminated brake fluid out of the master cylinder, calipers, or other hydraulic brake components and brake lines. To aid in the evacuation of air and contaminated fluid, the vehicle's brake lines typically include bleed valves. Modern vehicles may also include anti-lock braking systems ("ABS") for varying the pressure of the brake fluid delivered to each brake caliper located at each wheel. These ABS systems may also include bleeder valves for evacuating air and contaminated brake fluid from the ABS system. The pumps 12, 13 are used to provide positive pressure and/or a vacuum to the plurality of fluid distribution nodes 14.

Various vehicle manufacturers recommend specific brake flush sequences tailored to different makes and models. Using the brake flush machine 10, isolated brake flush procedures may be performed according to a desired sequence. Independent control of each solenoid valve 28 allows the brake flush machine 10 to isolate individual brake lines, ABS systems, and the master cylinder during the flush procedure. In this way, the fluid-distribution system 10 may better flush air and contaminants from specific portions of the vehicle's brake system.

The computing device 16 may be an embedded processor. Alternatively, the computing device may be a micro-processor, a field-programmable gate array ("FPGA"), an application-specific integrated circuit ("ASIC"), general purpose computer ("CPU"), or programmable logic device ("PLD"). The user interface 18 (FIG. 1) preferably includes a video display 19 such as a cathode ray tube ("CRT") or computer monitor or any of a variety of graphical touch screens. The user interface 18 may also include an input device such as a keyboard 42 or keypad, a mouse 44, or a touch-screen monitor 46. Alternatively, the user interface 18 may include a set of graphics and textual information, lamps, light-emitting diodes ("LEDs"), buttons, and switches.

Figure 2:
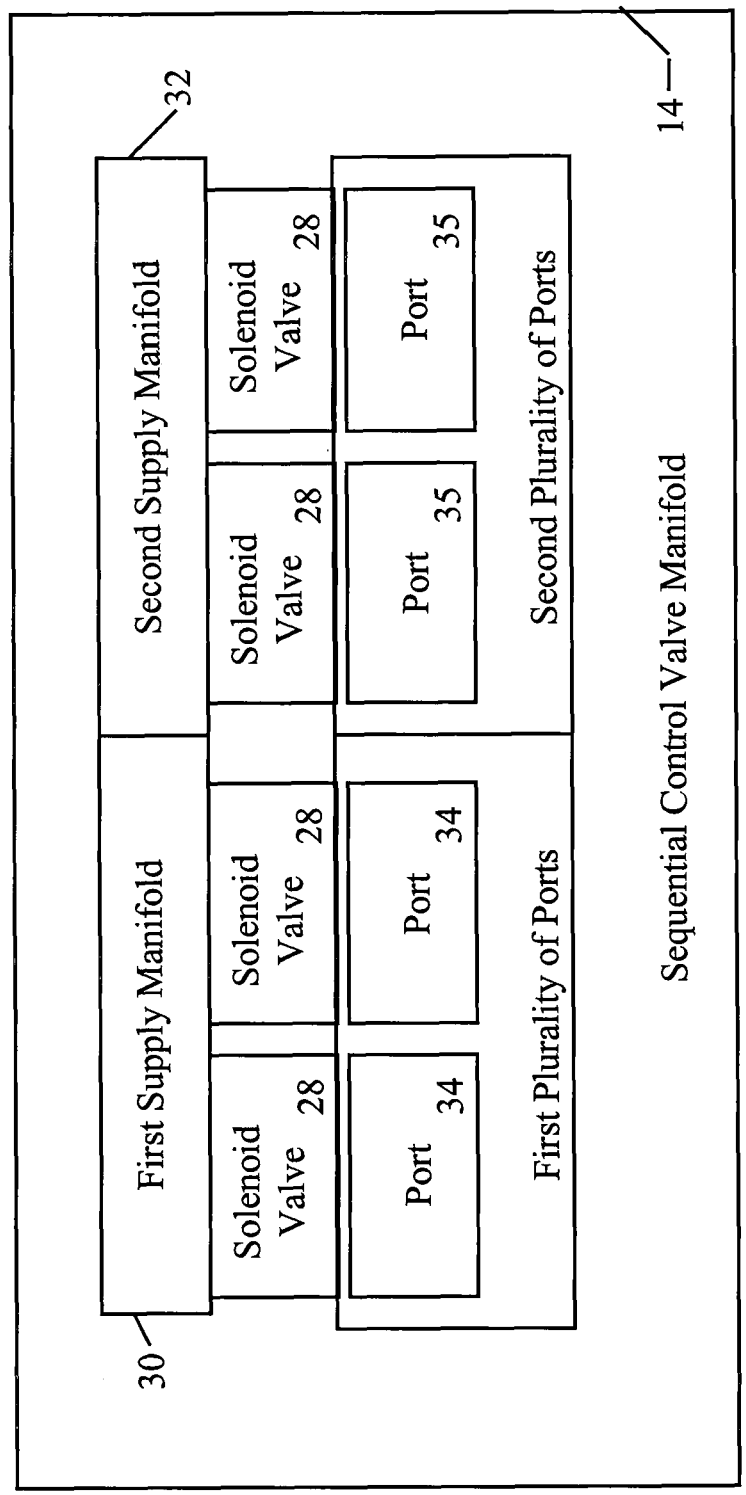
FIG. 2 is a block diagram of a main menu of the user-interface of FIG. 1.

In one embodiment of the invention, the user interface 18 illustrated by the block diagram of FIG. 2 includes a graphical user interface ("GUI") 50 including information display screens 52, menus 54, and selectable areas or graphical buttons 56. The graphical user interface 50 is a visual representation of a software application 57 stored in a memory device 17 and accessed by the computing device 16 of FIG. 1. If the video display 19 includes a touch-screen monitor 46, a user may select a displayed item from one of the menus 54 or one of the graphical buttons 56 simply by placing an object or finger in the general area of the displayed item. Alternatively, a user may move a graphical cursor or pointer to the desired location using the keyboard 42 or mouse 44 and depress a switch to indicate the intended choice.

Figure 3:
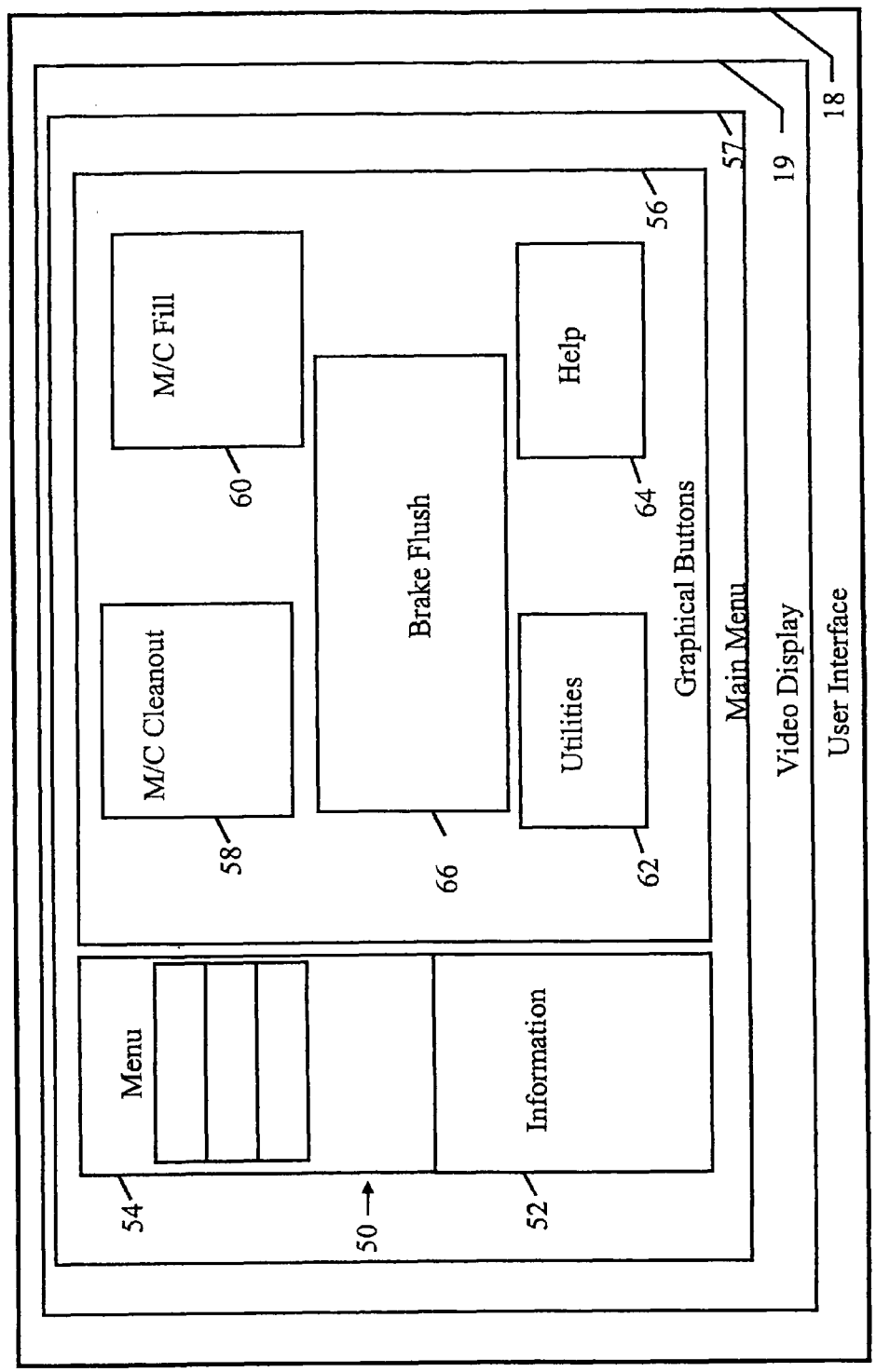
FIG. 3 is a block diagram of an optional master cylinder cleanout screen of the user-interface of FIG. 1.
Figure 4:
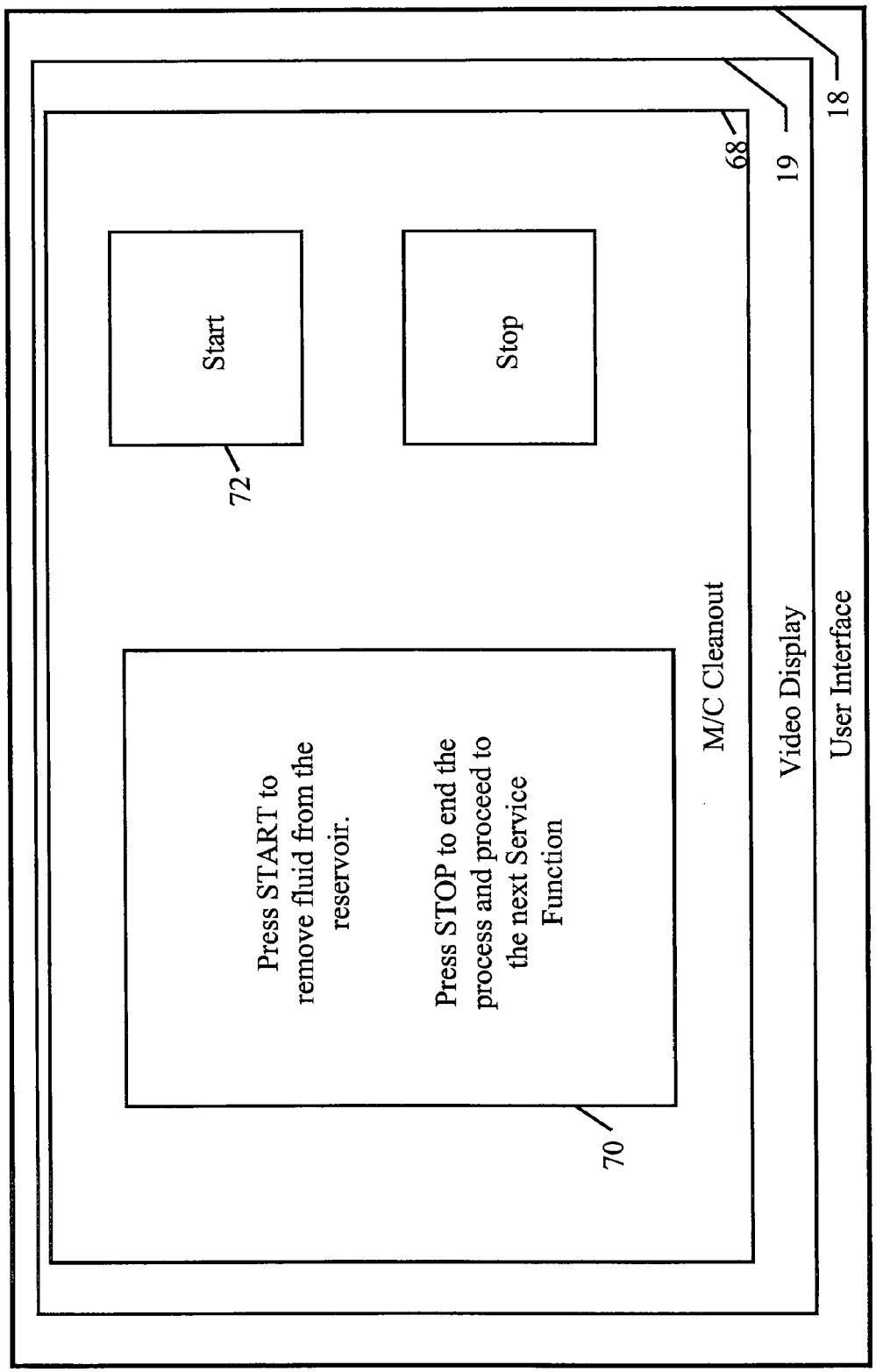
FIG. 4 is a block diagram of an optional safety screen of the user-interface of FIG. 1.

The display screen 52 of FIG. 3 is the main menu 57 of the preferred embodiment of the graphical user interface 50 of the fluid-distribution system 10 including graphical buttons for master cylinder cleanout 58, master cylinder fill 60, utilities 62, help 64, and brake flush 66. Selecting the master cylinder cleanout graphical button 58 invokes the information display screen 52 of the master cylinder cleanout menu 68 as illustrated by the block diagram of FIG. 4.

Figure 5:
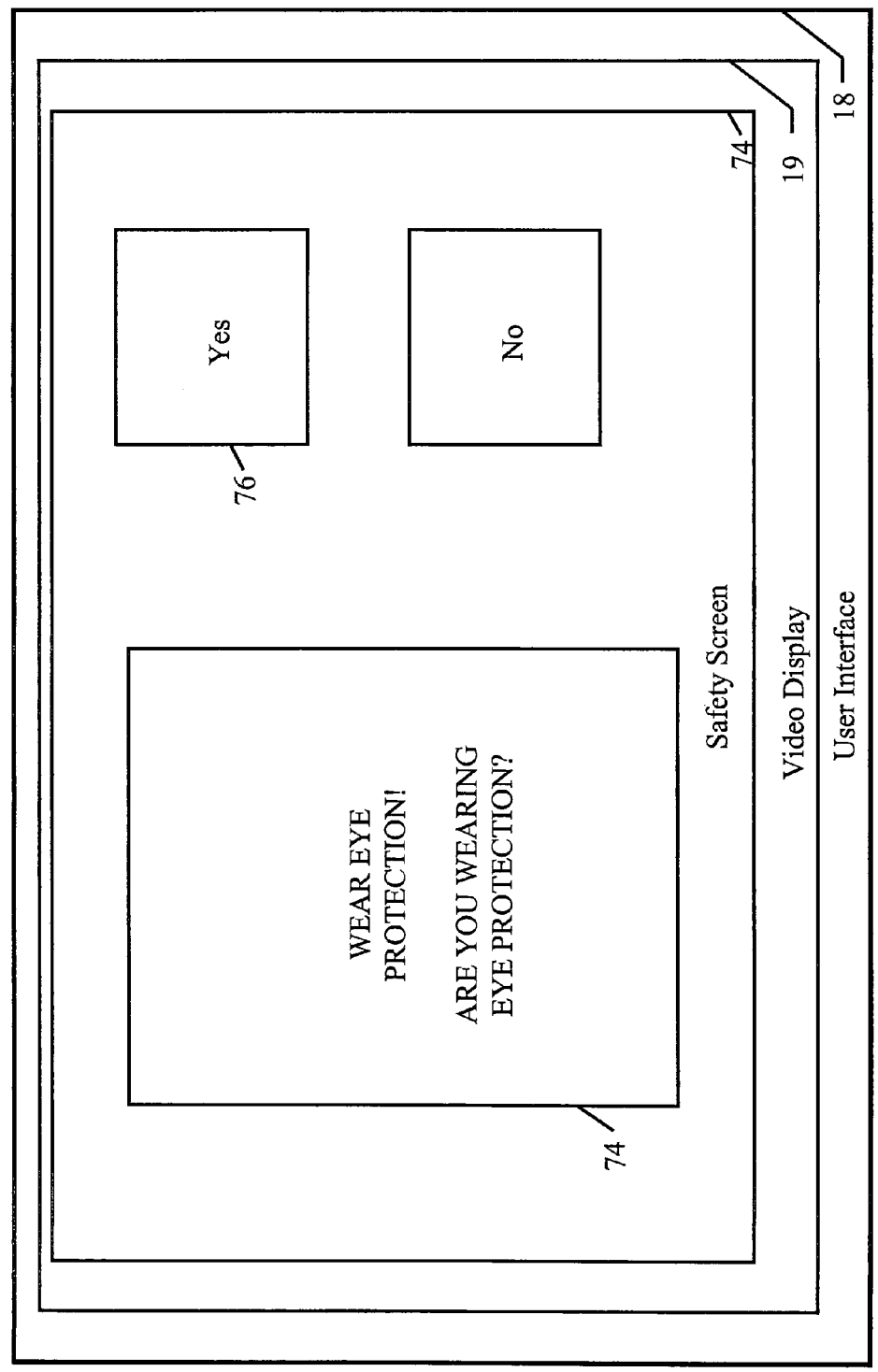
FIG. 5 is a block diagram of an optional test result input screen of the user-interface of FIG. 1.

The master cylinder cleanout menu 68 includes graphical buttons 56 and additional textual information 70 to assist a user in using the brake flush machine 10 properly. Once an activity as been selected, such as initiating a master cylinder cleanout procedure by selecting the start button 72, optional information screens may be displayed. In FIG. 5, the optional information safety screen 74 includes textual information 70 and a graphical compliance indicator button 76 for affirming compliance with proper safety procedure. The fluid-distribution system 10 may be adapted to prevent a user from continuing a brake flush procedure until he has positively indicated his compliance.

Figure 6:
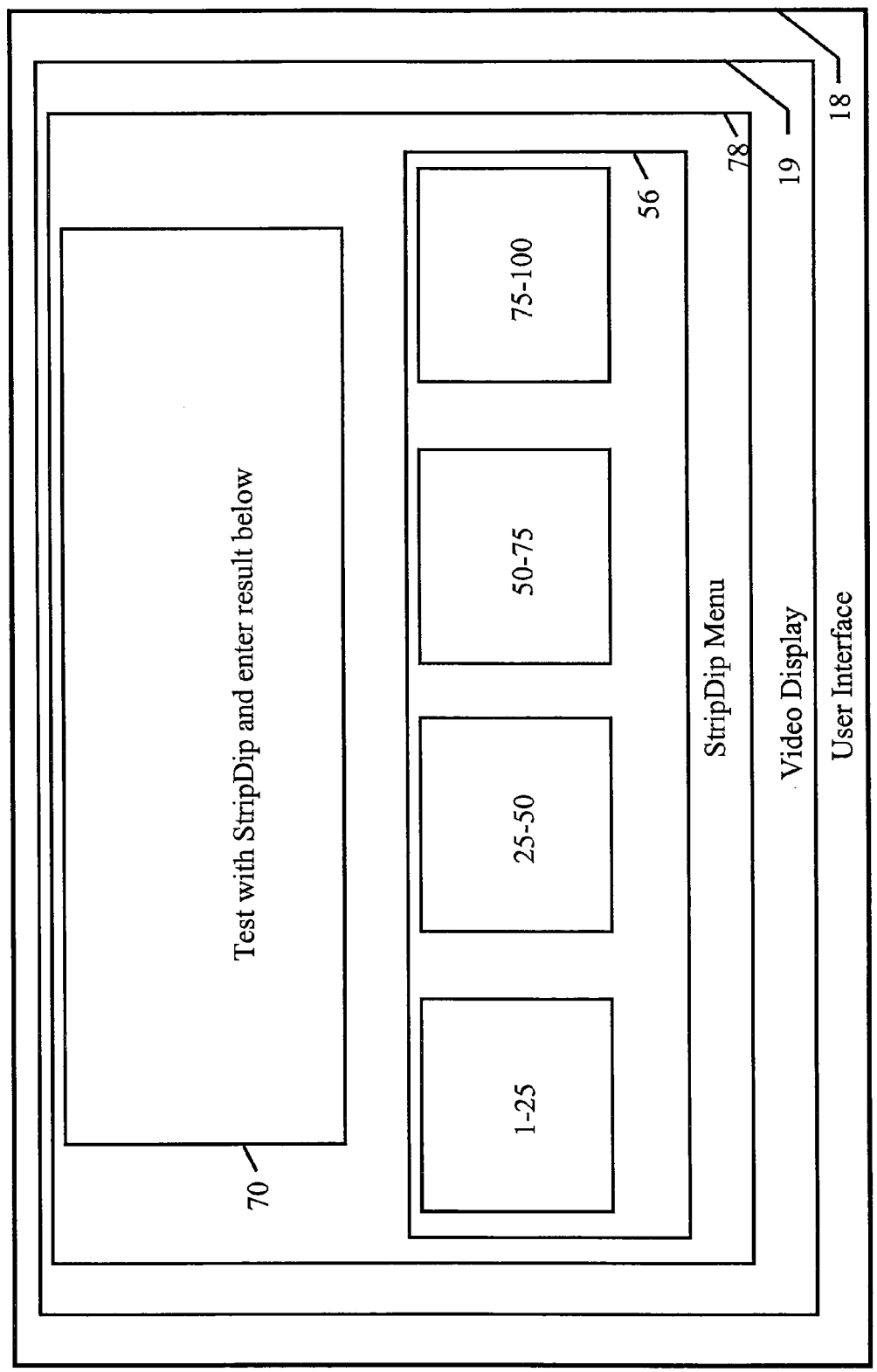
FIG. 6 is a block diagram of an optional system prime menu of the user-interface of FIG. 1.
Figure 7:
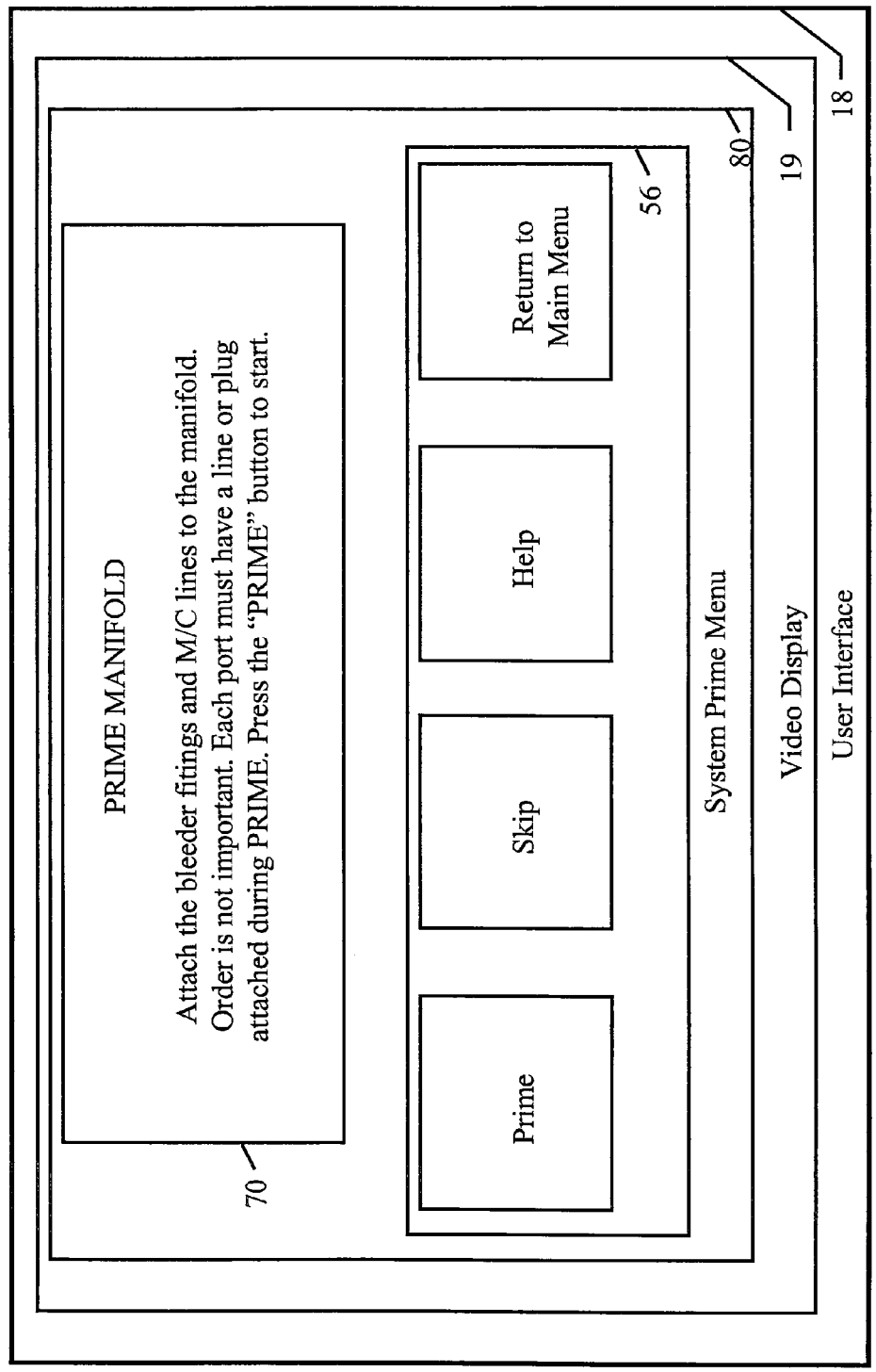
FIG. 7 is a block diagram of a fluid-distribution system of the user-interface of FIG. 1.

Additionally, optional data input screens such as the stripdip menu 78 of FIG. 6 may require that a technician or other user input specific information before proceeding with a brake flush procedure. Here, the stripdip menu 78 includes graphical buttons 56 for indicating the results of a stripdip test that gauges the amount of contaminants in a vehicle's brake system. This information may be used by the fluid-distribution system 10 to adjust the length of time dedicated to a brake flush procedure. A lower contaminant level may allow for a more perfunctory brake flush, while a high contaminant level may require a more extensive brake flush procedure. The system prime menu 80 illustrated by the block diagram of FIG. 7 includes textual information 70 and graphical buttons 56 for initiating or bypassing a priming procedure.

Once all information safety screen and data input screens have been managed properly, the computing device 16 will initiate a procedure such as priming the sequential control valve manifold 14, evacuating a master cylinder, or flushing contaminants from a vehicle's brake lines. This is accomplished by the computing device 16 sending control signals to the pumps 12, 13 and the solenoid valves 28 (FIG. 1). By regulating which pumps are operative and which solenoid valves are open or closed, the fluid-distribution system 10 can perform any of a multitude of brake flush procedures, as previously indicated.

Figure 8:
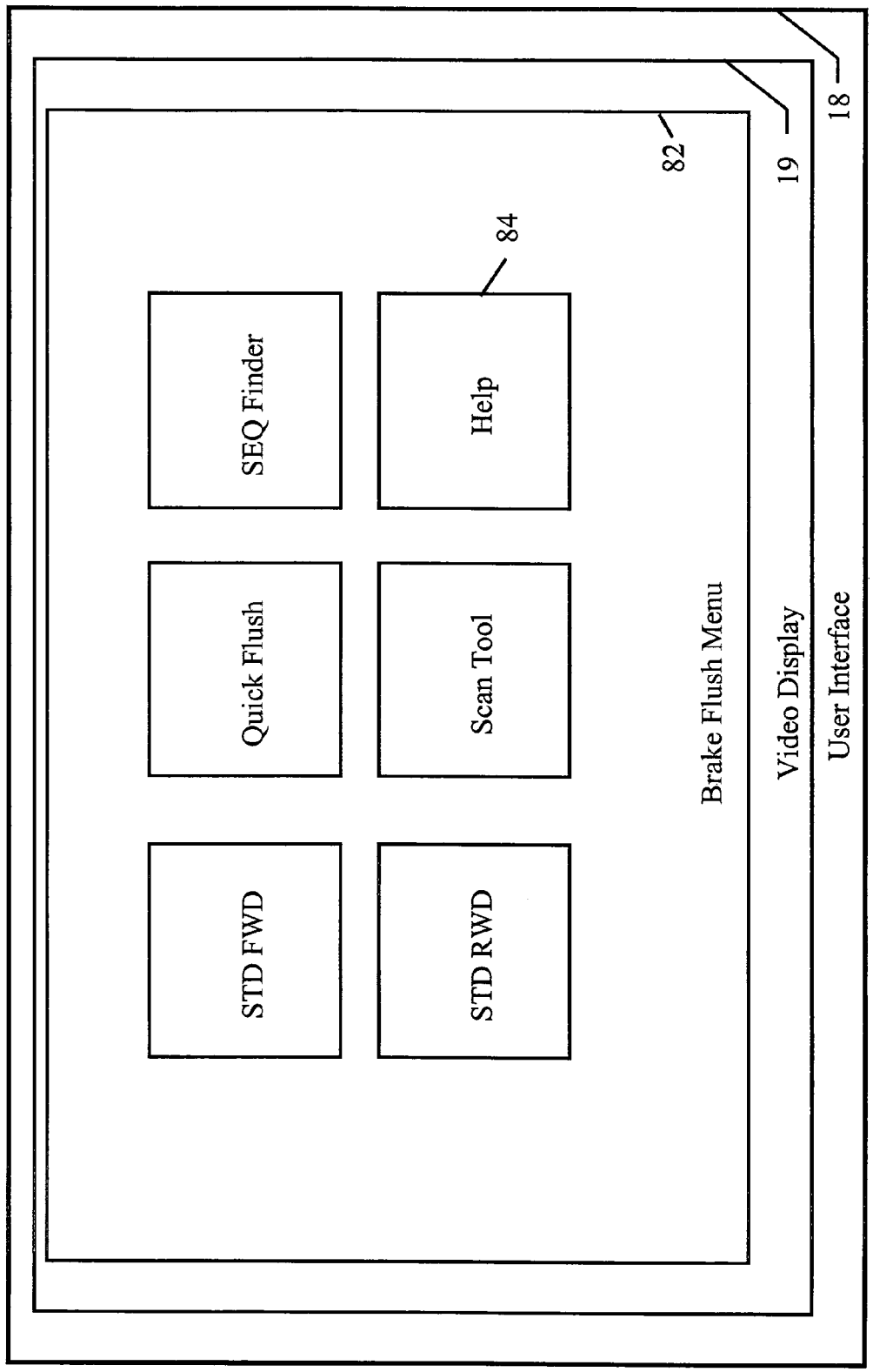
FIG. 8 is a block diagram of a brake flush help menu of the user-interface of FIG. 1.
Figure 9:
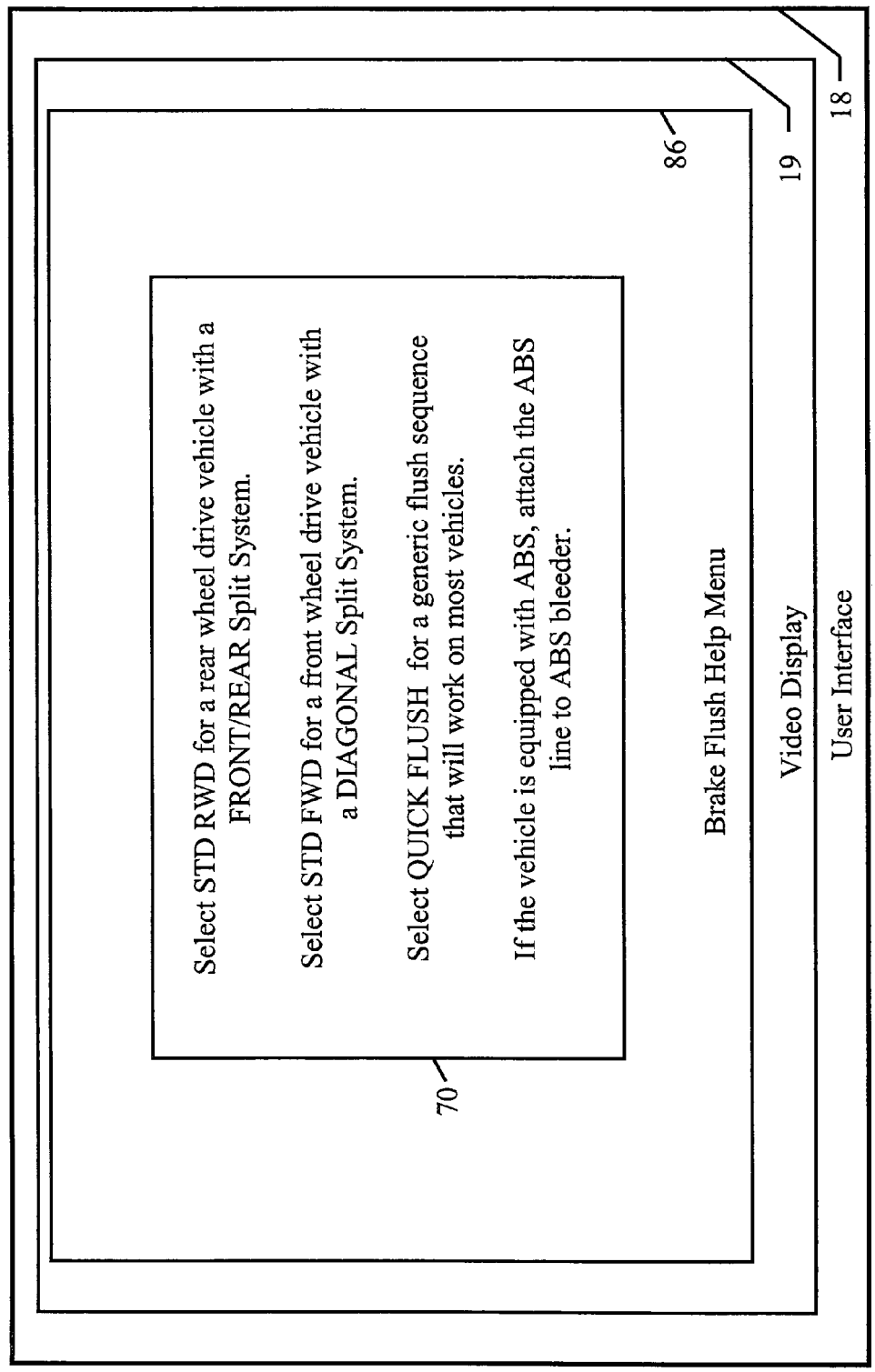
FIG. 9 is a block diagram of a brake flush status screen of the user-interface of FIG. 1.

Referring back to the main menu 57 illustrated by FIG. 3, selecting the brake flush graphical button 66 invoke the brake flush menu 82 illustrated by FIG 8. Selecting the help graphical button 84 invokes the brake flush help menu of FIG. 9 which includes additional textual information 70 to aid a technician in the proper use of the fluid-distribution system 10.

Figure 10:
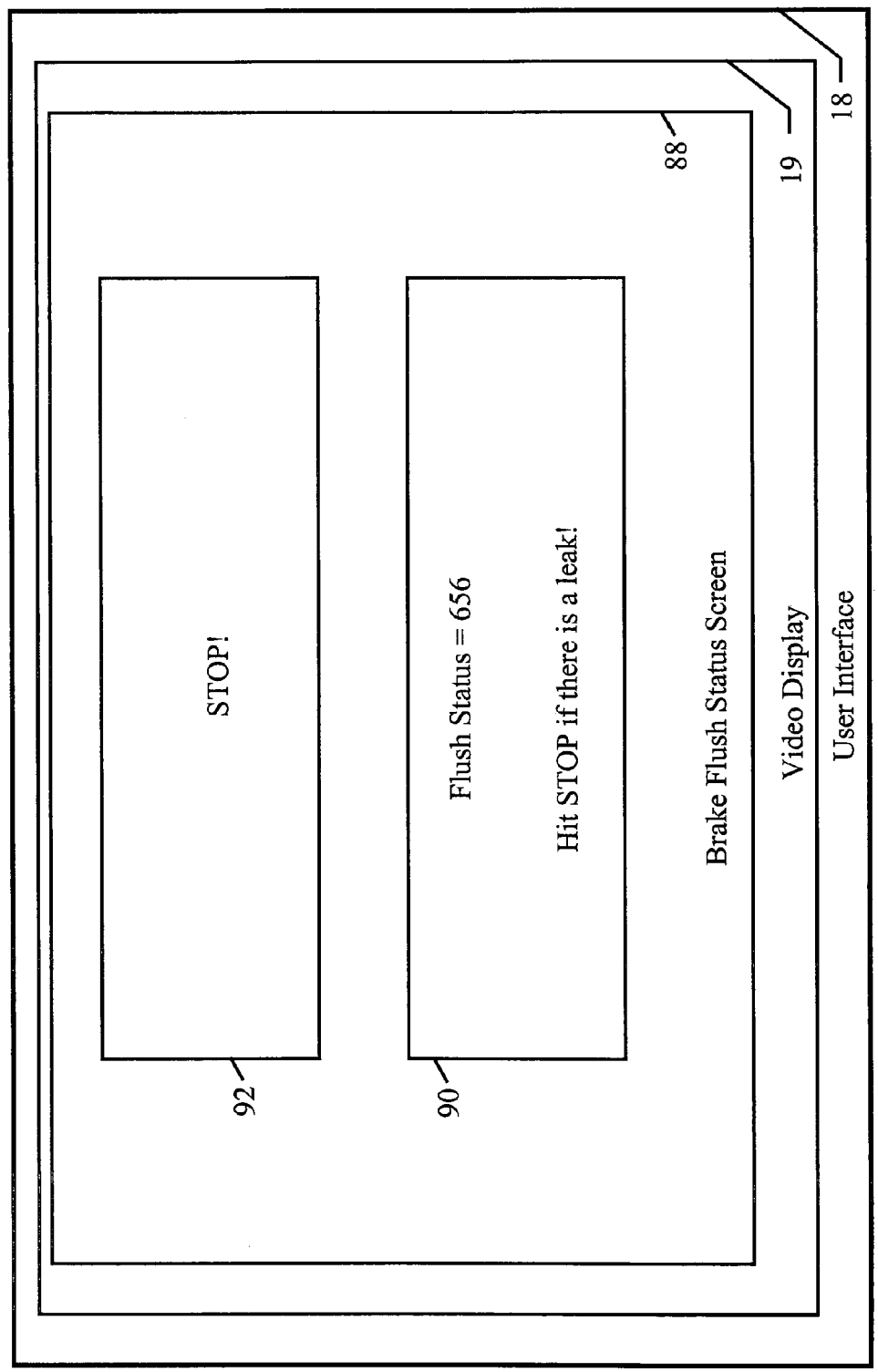
FIG. 10 is a block diagram of a event notification screen of the user-interface of FIG. 1.
Figure 11:
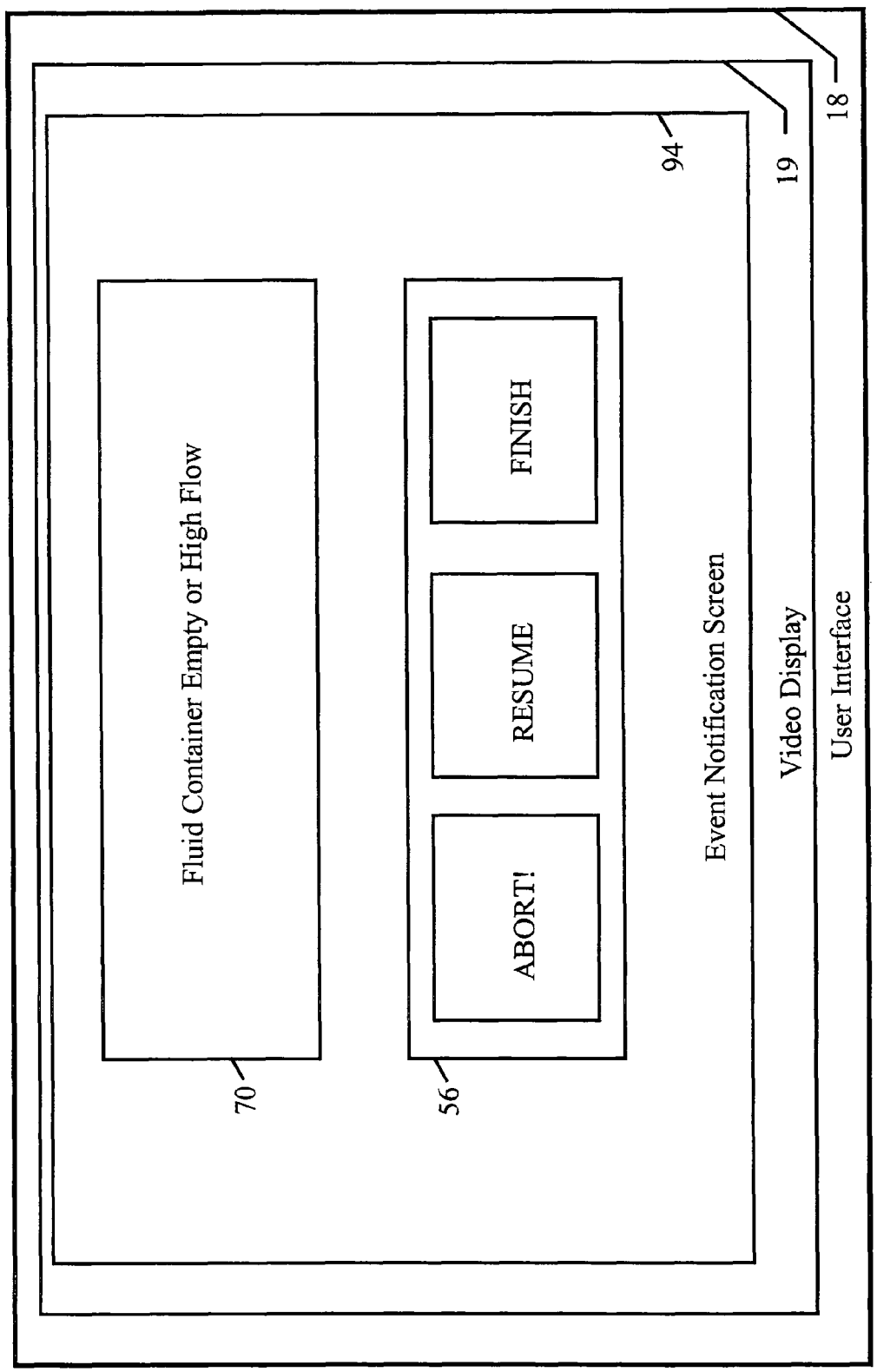
FIG. 11 is a block diagram of a second brake status screen.
Figure 12:
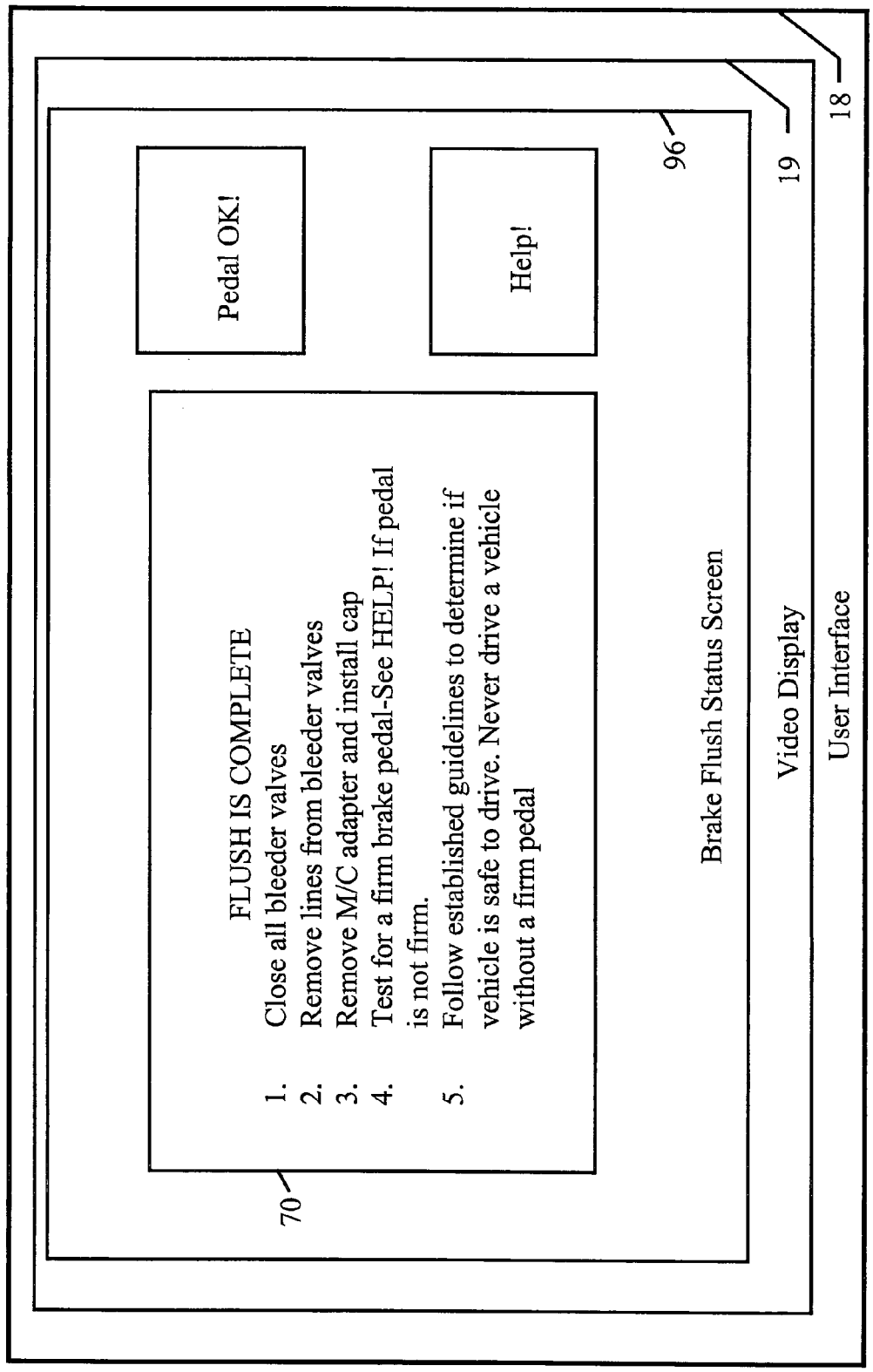
FIG. 12 is a block diagram of a scantools interface.

The block diagram of FIG. 10 indicates a brake flush status screen 88 including a dynamic graphical status display 90 and a stop graphical button 92 for interrupting a brake flush procedure. Event notification screens 94, such as the one illustrated in FIG. 11, are displayed when the computing device 16 detects an anomalous condition and temporarily interrupts a brake flush procedure. In this example, a user may either terminate the brake flush procedure, resume the procedure, or correct the problem and resume the procedure. A second brake flush status screen 96, as illustrated by the block diagram of FIG. 12, includes additional textual information 70 and graphical buttons 56 for completing a brake flush procedure.

Figure 13:
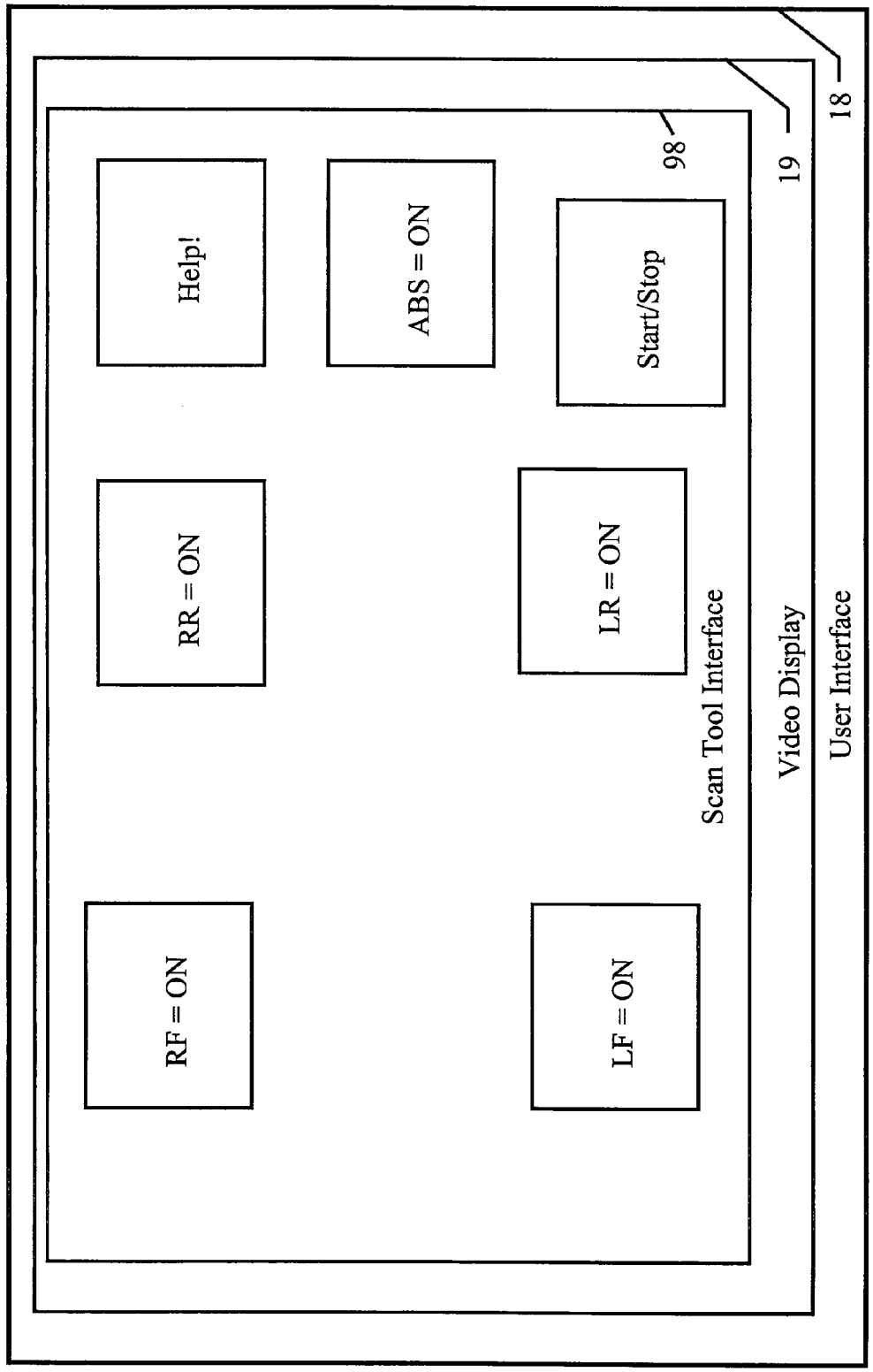
FIG. 13 is a flow chart illustrating a brake flush algorithm utilizing the fluid-distribution system of FIG. 1.

Selecting the utilities graphical button 62 (FIG. 3) from the main menu 57 may invoke optional procedures such as a scan tool interface 98, as illustrated in FIG. 13. Vehicle manufactures sometimes develop automated diagnostic applications called scantools. The fluid-distribution system 10 is designed to interface with these scantools. In an exemplary interface of the invention with scantools, a scantool will prepare the vehicle's engine and brake controller for a brake system flush. Using input signals from the scantool application, the computing device 16 may prompt the user to flush new brake fluid through isolated branches of the vehicle's brake system according to a sequence and schedule dictated by the manufacturer.

Vehicle manufacturers have created a protocol for communicating with the vehicle's computer. The tool used to communicate with the vehicle computer is commonly referred to as a scan tool. A scan tool may also be bidirectional, meaning it can directly control or initiate procedures. One such procedure is preparing the ABS system for bleeding and flushing.

Figure 14:
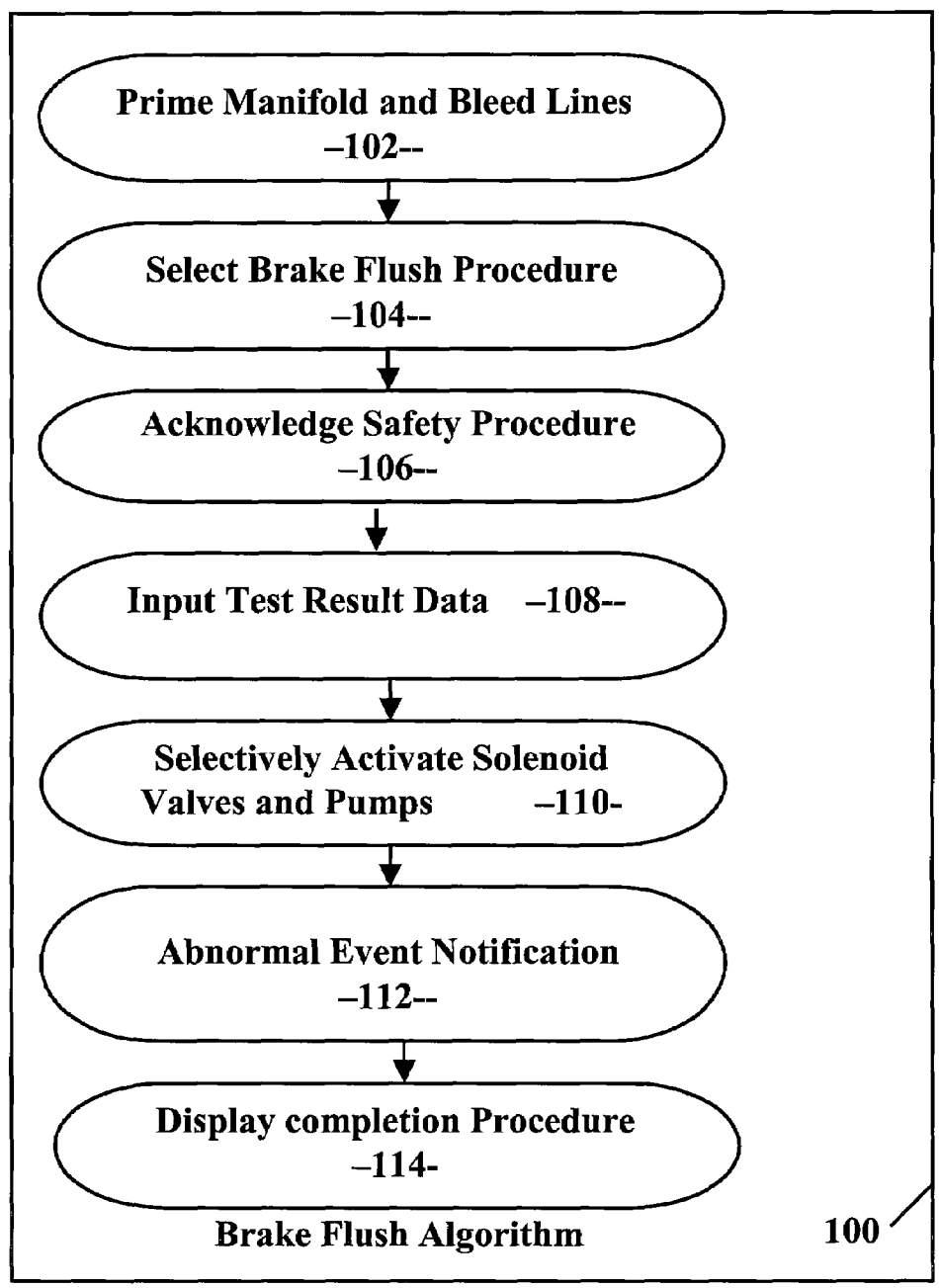
FIG. 14 is a block diagram illustrating a fluid-distribution system including one or more pumps, a first, second, and third distribution node, a plurality of three-port valves, and a plurality of bleed/flush lines according to the invention.

FIG. 14 is a flow chart illustrating a brake flush algorithm 100 utilizing the brake flush machine of FIG. 1. In step 102, a user initiates a closed-circuit priming procedure. In step 104, the user selects a brake flush procedure such as master cylinder cleanout, master cylinder fill, or brake flush. Optional steps 106 and 108 include acknowledging proper safety procedures and inputting test result data, respectively. In step 110, the computing device 16 initiates a brake flush procedure by selectively activating pumps 12, 13 and opening ports 34 and alternate ports 35. In optional step 112, abnormal conditions such as low pressure or low fluid flow are displayed as event notifications screens and in step 114, completion procedures are displayed for the technician.

Other features of the fluid-distribution system 10 include the ability to transfer contaminated brake fluid from the waste receptacle 20, test the pumps 12, 13, and troubleshoot problems with the solenoid valves 28. Additionally, the fluid-distribution system 10 may be integrated with a brake flush accelerator as described in U.S. patent application Ser. No. 10/981,060 which is hereby incorporated by reference.

Figure 15:
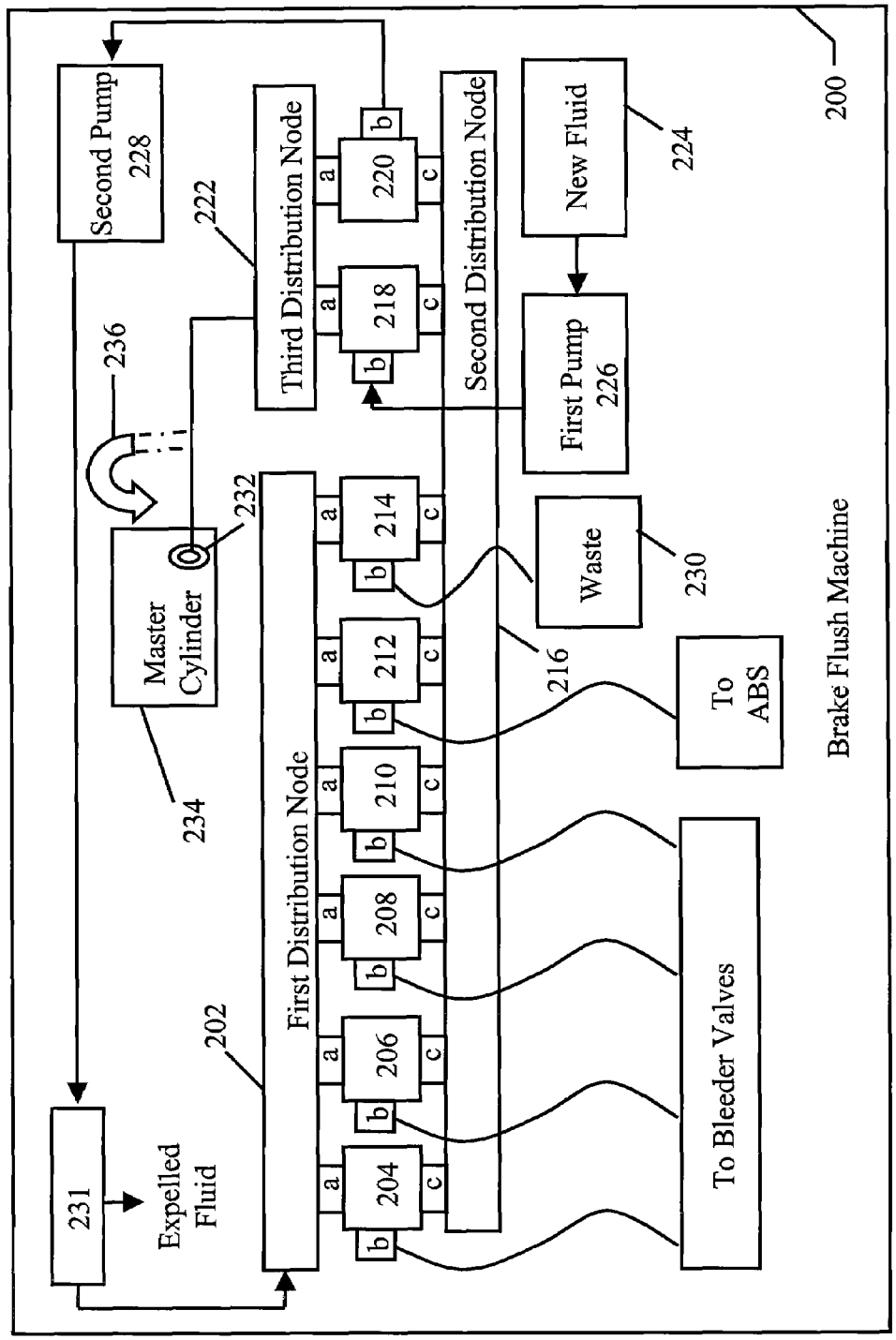
FIG. 15 is a table indicating the status of the pumps and three-port valves of the fluid-distribution system illustrated in FIG. 15 during various disparate procedures.

In one embodiment of the invention, as illustrated in FIG. 15, a fluid-distribution system 200 includes a first distribution node 202 connected to a first plurality of three-port valves 204, 206, 208, 210, 212, 214. These three-port valves may include solenoid valves that create a first path for fluid flow from their top ports 204a, 206a, 208a, 210a, 212a, 214a and their common ports 204b, 206b, 208b, 210b, 212b when the solenoid valves are not energized. In this embodiment of the invention, the first paths may be closed off and second paths created from the common ports to the bottom ports 204c, 206c, 208c, 210c, 212c, 214c which are, in turn, connected to a second distribution node 216 when the solenoid valves are energized. A second plurality of three-port valves 218, 220 connect the second distribution node 216 to a third distribution node 222.

A new fluid container 224 is connected to a first pump 226 which is, in turn, connected to the common port 218b. The common port 220b is connected to a second pump 228 which is connected through an optional three-port valve 231 for expelling brake fluid from the system to the first distribution node 202.

The common port 214b is connected to a waste container 230 that stores contaminated fluid during normal use. When it is desirable to empty the waste container 230, the waste container 230 may be purged through the fluid-distribution system 200 and expelled through the optional three-port valve 231. Alternatively, the waste container 230 may be drained or poured into a container which is external to the fluid-distribution system 200.

The common ports 204b, 206b, 208b, 210b are connected by bleed/flush lines 22 to a vehicles bleeder valves (also not shown). The common port 212b is optionally connected to a vehicle's ABS system (not shown). The third distribution node 222 is connected by an optional master/cylinder adapter 232 to a vehicle's master cylinder 234 Alternatively, the master/cylinder adapter 232 may be replaced with an evacuate gun 236 designed to suck fluid and contaminants from the master cylinder Using this fluid-distribution system 200, an operator may perform a variety of functions without having to reconfigure hoses and bleed/flush lines, as illustrated in the table of FIG. 16. In the first row, the valves of the brake flush machine are configured so that an operator may evacuate a vehicle's master cylinder. First, the evacuate gun 236 is placed on a bleed/flush line 22 attached to the third distribution node 222. Solenoid 220 is not energized, creating a path from the third distribution node 222 to the second pump 228. Solenoid 214 is energized creating a path from the first distribution node 202 to the waste container 230. The second pump 228 is turned on. In this manner, a vacuum is created at the master cylinder 234 which pulls brake fluid and contaminants from the master cylinder, through the evacuate gun 236, through the third distribution node 222, solenoid 220, the second pump 228, the optional three-port valve 231, the first distribution node 202, the solenoid 214, to the waste container 230.

It is noted for completeness that solenoids 204, 206, 208, 210, 212, 216 are energized and the first pump 226 is turned off removing the associated bleed/flush lines, the vehicle's bleeder valves, and the new fluid container 224 from the evacuation procedure.

The second row of the table of FIG. 16 indicates the procedure for filling the master cylinder 234 with new brake fluid from the new fluid container 224. The first pump 226 is turned on drawing new fluid from the new fluid container 224 through the non-energized solenoid 218, the third distribution node 222, and the master/cylinder adapter 232 to the master cylinder. This procedure may also be used to flush a master cylinder when it is disconnected from the vehicle, as in a bench bleed.

To flush a single brake line on the vehicle, the procedure of the third row is implemented. The first pump 226 is on, drawing new fluid from the new fluid container 224 through the solenoid 218, through the third distribution node 222, to the vehicles master cylinder. The fluid is forced through the vehicles brake system, through a bleed/flush line 22, through the solenoid 204, the first distribution node 202, and another solenoid 214 to the waste container 230. Likewise, flushing a vehicle's other brake lines and ABS system, if present, are illustrated in rows four through seven. To flush all of the vehicles brake lines and ABS system simultaneously, the procedure of row 8 is used.

To empty contaminated fluid from the waste container 230, the procedure illustrated in the ninth row is implemented. Solenoids 214, 220 are energized and the second pump 228 is active drawing the contaminated fluid through solenoid 214, the second distribution node 216, the solenoid 220, the second pump 228, and the three-port valve 231. In this instance, the three-port valve 231 is turned so as to expel ("expel") the fluid from the system, rather than allowing it to pass through ("P/T").

The tenth row of the table of FIG. 16 illustrates a procedure for vacuuming fluid from the brake lines. In this instance, the first pump 226 is on, pumping new fluid from the new fluid container 224 through solenoid 218, through the third distribution node 222, and into the master cylinder 234. The fluid is forced through the vehicle's brake lines (not shown) and is extracted from the bleeder valves by a vacuum created by the second pump 228. Here, the second pump draws the brake fluid through solenoid valves 204, 206, 208, 210, 212, through the second distribution node 216, and the solenoid valve 220. The fluid is then forced into the first distribution node 202 and solenoid valve 214 into the waste container 230. This procedure may be alternatively performed without the aid of the pressure supplied by the first pump 226, as well.

Row 12 of FIG. 16 illustrates a cross-flush process where fluid is introduced into a line and extracted from another line. The second pump 228 simultaneously applies vacuum to the second distribution node 216 and pressurizes the first distribution node 202 in order to pressurize some lines while simultaneously applying vacuum to others. For example, new brake fluid may be introduced through the first pump 226, solenoid valve 218, and the third distribution node 222. This fluid is evacuated through solenoid valves 204, 208, 210, 212 (but not 206), partly recirculated through solenoid valve 206 to cross-bleed through the vehicle and partly sent to the waste container 230 through solenoid valve 214. Many variations of this cross-bleed process may be used to pressurize and vacuum individual wheel lines. Alternatively, this process may be executed with the first pump 226 off.

Row 13 of the table of FIG. 16 illustrates an alternate cross bleed procedure. New brake fluid may be introduced into the vehicle through the first pump 226, solenoid valve 218, the second distribution node 216, and solenoid valve 204. This fluid is evacuated through solenoid valves 206, 208, 210, 212 and the first distribution node 202 and sent to the waste container 230 through solenoid valve 214.

If the second pump is powered on during the alternate cross bleed procedure, a vacuum is applied to the master cylinder through the third distribution node 222. The fluid extracted from the master cylinder will be sent to the first distribution node 202 where it is combined with the fluid arriving through solenoid valves 206, 208, 210, 212 and sent to the waste container 230 through the solenoid valve 214.

Figure 17:
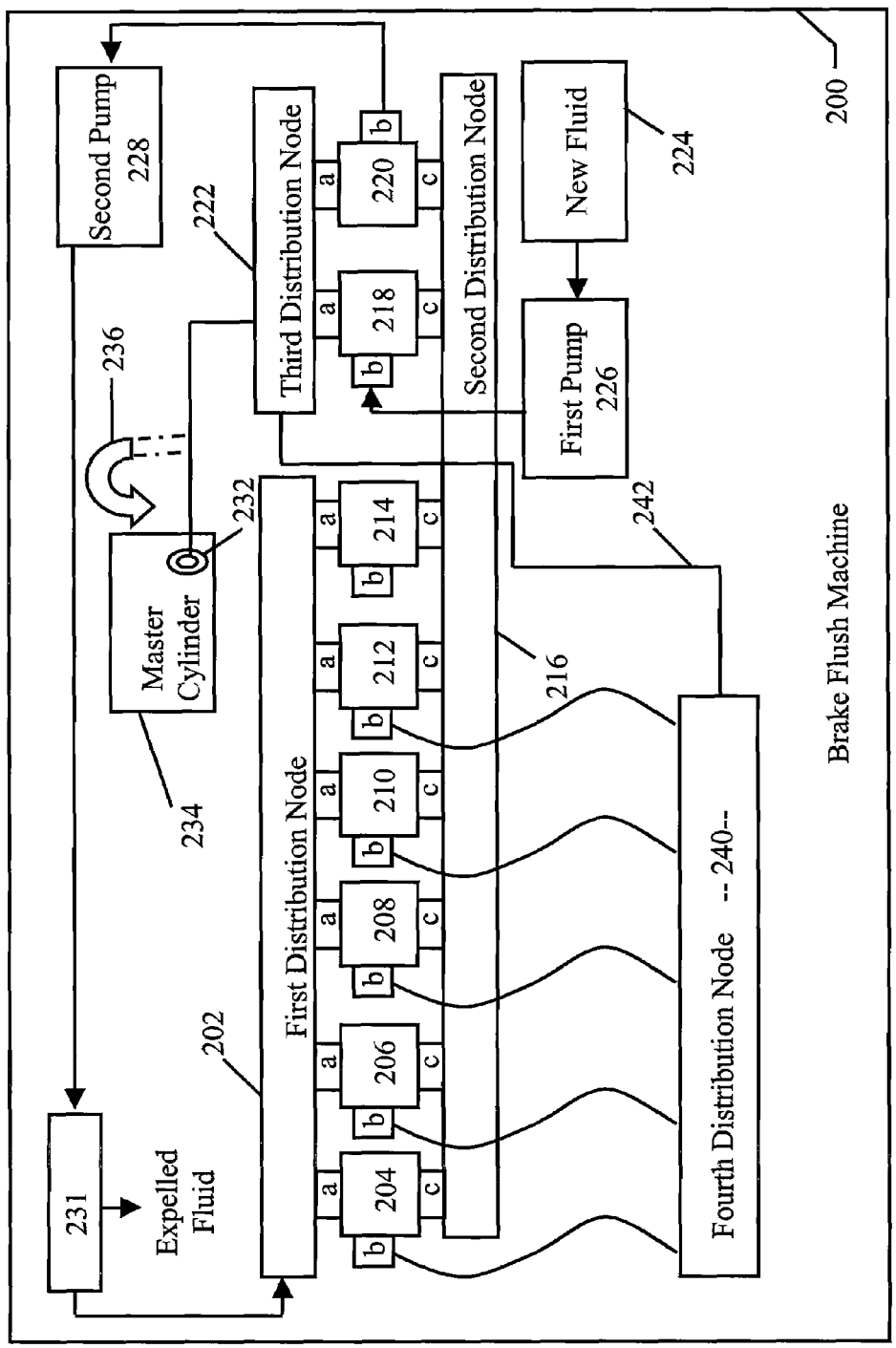
FIG. 17 is a block diagram illustrating an optional fourth distribution node.
Figure 18:
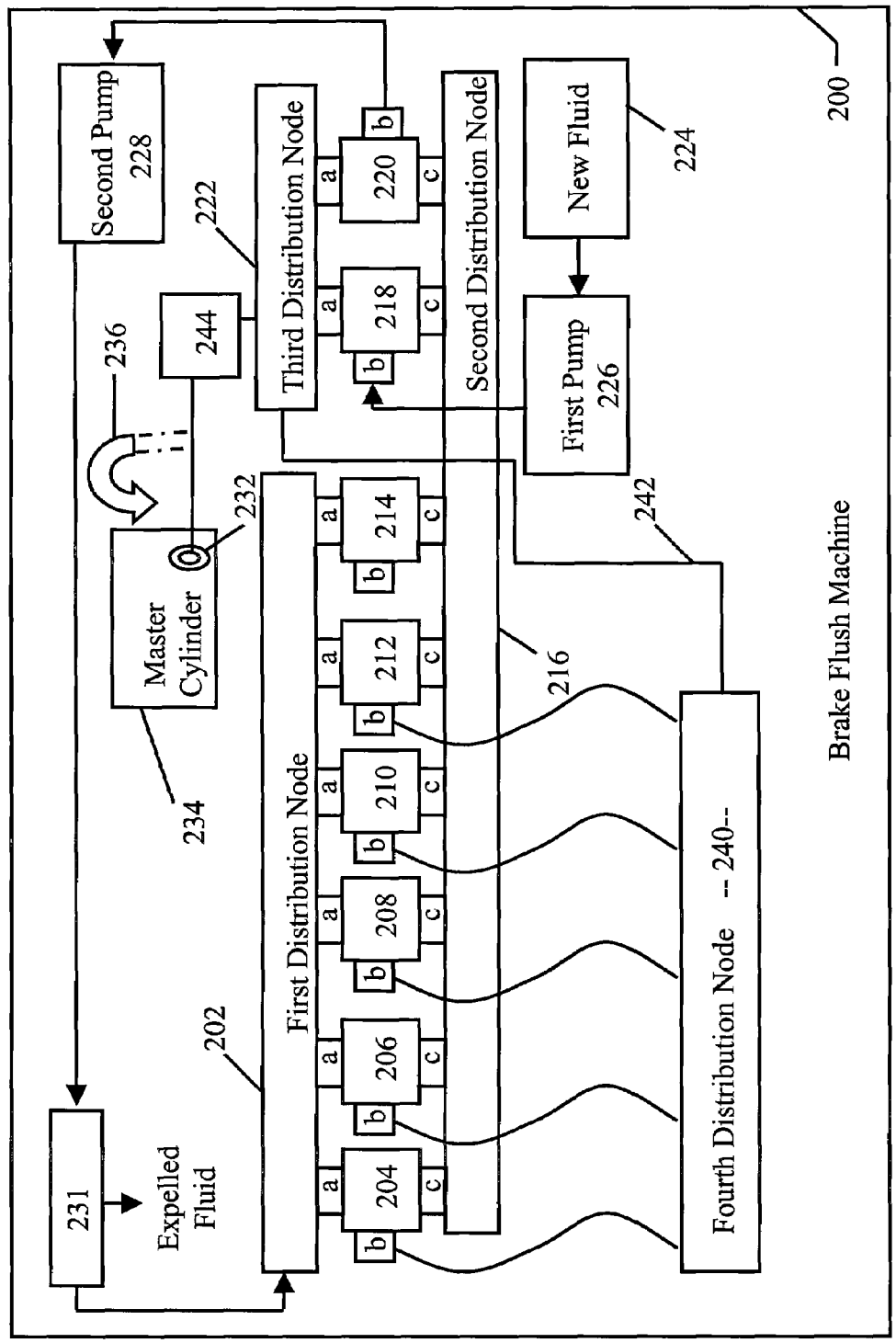

An optional fourth distribution node 240 is shown in the illustration of Figure 17. Here, the bleed/flush lines are connected from the common ports 204b, 206b, 208b, 210b, 212b to the fourth distribution node 240 and the priming procedure of the fourteenth row of the table of FIG. 16 is implemented to prime the fluid-distribution system 200 and the bleed/flush lines 22 with new fluid. Solenoid 218 is not energized and the first pump 226 is activated, drawing new brake fluid from the new fluid container 224 into the third distribution node 222. A hose 242 connects the third distribution node 222 to the fourth distribution node 240, allowing the new fluid to flow to the bleed/flush lines 22, through the solenoids 204, 206, 208, 210, 212, through the first distribution node 202, through solenoid 214, to the waste container 230. A valve prevents outflow through the bleed/flush line for the waste cylinder.

All of these procedures may be facilitated by either removing the check valves 36 or using an improved check valve 36. While a traditional check valve maybe used to prevent fluid from flowing from the line as it is removed from the wheel and dropped to the floor, a specialized check valve may prevent reverse fluid flow only when under low pressure. For example, this improved check valve may prevent reverse flow until pressure reaches 1 or 2 psi and then becomes unseated, allowing reverse fluid flow.

Those skilled in the art of making fluid-distribution system may develop other embodiments of the present invention. However, the terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

I claim:

1. A fluid-distribution system for a brake-flush machine, comprising:
    a first manifold, a second manifold, and a third manifold;
    a plurality of first lines adapted for coupling to discrete fluid-flow elements;
    a plurality of first valves for alternatively placing each of said plurality of first lines in fluid communication with the first manifold or the second manifold, wherein the valves are seleniod valves coupled with the manifolds;
    a first pump connecting a source of fluid to the third manifold;
    a second line connecting the second and first manifolds;
    a third line for coupling the third manifold to an additional discrete fluid-flow element;
    a computing device configured to independently control said solenoid valves;
    a memory device; and
    a graphical user interface operably connected to said computing device and that is configured to provide a scan tool interface with said brake flush machine.

2. The system of claim 1, further including an additional first line connecting the system to a waste disposal unit.

3. The system of claim 2, further including an additional first valve for alternatively placing said additional first line in fluid communication with the first manifold or the second manifold.

4. The system of claim 2, wherein said discrete fluid-flow elements include bleeder valves and an anti-lock valve of a vehicle's brake system, and said additional discrete fluid-flow element is the vehicle's master cylinder.

5. The system of claim 1, further including a second valve coupled to said second line for alternatively placing the second manifold or the third manifold in fluid communication with the first manifold.

6. The system of claim 5, further including a second pump in said second line, said second pump being adapted to pressurize the first manifold.

7. The system of claim 1, further including a third valve coupled to said first pump for alternatively placing the first pump in fluid communication with the second or third manifold.

8. The system of claim 1, wherein said discrete fluid-flow elements include bleeder valves and an anti-lock valve of a vehicle's brake system, and said additional discrete fluid-flow element is the vehicle's master cylinder.

9. The system of claim 1, further including a second pump in said second line, said second pump being adapted to pressurize the first manifold.

10. The system of claim 1, further including an additional valve in said second line, said additional valve being adapted to expel fluid from the system.

11. The system of claim 1, wherein said first, second and third manifolds are part of an integral structure.

12. The system of claim 1, further including a fourth manifold adapted for fluid coupling to at least some of said first plurality of lines and to said third manifold.

13. The system of claim 1, further including an additional first valve for alternatively placing an additional first line in fluid communication with the first manifold or the second manifold; a second valve coupled to said second line for alternatively placing the second manifold or the third manifold in fluid communication with the first manifold; a third valve coupled to said third line for alternatively placing the first pump in fluid communication with the second or third manifold; a second pump in said second line, said second pump being adapted to pressurize the first manifold; and an additional valve in said second line, said additional valve being adapted to expel fluid from the system; wherein said first, second and third manifolds are part of an integral structure.

14. The system of claim 13, further including a fourth manifold adapted for fluid coupling to at least some of said first plurality of lines and to said third manifold.

15. A method of flushing a vehicle's brake system comprising the following steps:
    providing a brake-flush machine that includes
        a first manifold, a second manifold, and a third manifold;
        a plurality of first lines adapted for coupling to bleeder valves of a vehicle's brake system;
        a plurality of first valves for alternatively placing said plurality of first lines in fluid communication with the first manifold or the second manifold, wherein the valves are solenoid valves coupled with the manifolds;
        a first pump connecting a source of fluid to the third manifold;
        a second line connecting the second and first manifolds;
        a third line for coupling the third manifold to a master cylinder of the vehicle's brake system;

an additional first line connecting the system to a waste disposal unit;

a computing device configured to independently control said solenoid valves;

a memory device; and a graphical user interface operably connected to said computing device and that is configured to provide a scan tool interface with said brake flush machine;

connecting said plurality of first lines to said bleeder valves of the vehicle's brake system;

connecting said third line to said master cylinder of the vehicle's brake system;

operating said plurality of first valves to provide fluid connection between the first manifold and at least one of said bleeder valves of the vehicle's brake system and between the second manifold and the balance of said bleeder valves; and activating said first pump.

16. The method of claim 15, further including the steps of providing an additional line adapted for coupling to an anti-lock valve of the vehicle's brake system and an additional valve for alternatively placing the additional line in fluid communication with the first manifold or the second manifold, connecting the additional line to said anti-lock valve, and operating said plurality of first valves and said additional valve to provide fluid connection between the first manifold and at least one of said bleeder and anti-lock valves of the vehicle's brake system and between the second manifold and the balance of said bleeder and anti-lock valves.

17. The method of claim 15, further including the step of providing a second pump in said second line, said second pump being adapted to pressurize the first manifold; and activating said second pump.

18. The method of claim 17, further including the steps of providing an additional line adapted for coupling to an anti-lock valve of the vehicle's brake system and an additional valve for alternatively placing the additional line in fluid communication with the first manifold or the second manifold, connecting the additional line to said anti-lock valve, and operating said plurality of first valves and said additional valve to provide fluid connection between the first manifold and at least one of said bleeder and anti-lock valves of the vehicle's brake system and between the second manifold and the balance of said bleeder and anti-lock valves.

19. A method of bleeding a vehicle's brake system comprising the following steps:

providing a brake-flush machine that includes a first manifold, a second manifold, and a third manifold;

a plurality of first lines adapted for coupling to bleeder valves of a vehicle's brake system;

a plurality of first valves for alternatively placing said plurality of first lines in fluid communication with the first manifold or the second manifold, wherein the valves are solenoid valves coupled with the manifolds;

a first pump connecting a source of fluid to the third manifold;

a second line connecting the second and first manifolds;

a third line for coupling the third manifold to a master cylinder of the vehicle's brake system;

a second pump in said second line, said second pump being adapted to pressurize the first manifold;

an additional valve for connecting the system to a waste disposal unit downstream of said second pump;

a computing device configured to independently control said solenoid valves;

a memory device; and a graphical user interface operably connected to said computing device and that is configured to provide a scan tool interface with said brake flush machine;

connecting said plurality of first valves to said bleeder valves of the vehicle's brake system;

operating said plurality of first valves to provide fluid connection between the second manifold and said bleeder valves of the vehicle's brake system; and activating said second pump.

20. The method of claim 19, further including the steps of providing an additional line adapted for coupling to an anti-lock valve of the vehicle's brake system and an additional valve for alternatively placing the additional line in fluid communication with the first manifold or the second manifold, connecting the additional line to said anti-lock valve, and operating said plurality of first valves and said additional valve to provide fluid connection between the first manifold and at least one of said bleeder and anti-lock valves of the vehicle's brake system and between the second manifold and the balance of said bleeder and anti-lock valves.

21. The method of claim 20, further including the step of connecting one of said plurality of first valves to said anti-lock valve of the vehicle's brake system.

22. The method of claim 19, further including the step of connecting one of said plurality of first valves to said anti-lock valve of the vehicle's brake system.

* * * * *